United States Patent [19]

Mougne

[11] Patent Number: 4,506,156
[45] Date of Patent: Mar. 19, 1985

[54] EARTH FORMATION POROSITY DETERMINATION WITH DUAL EPITHERMAL NEUTRON DETECTOR SYSTEM

[75] Inventor: Marcel L. Mougne, Houston, Tex.

[73] Assignee: Gearhart Industries, Inc., Fort Worth, Tex.

[21] Appl. No.: 288,792

[22] Filed: Jul. 31, 1981

[51] Int. Cl.³ .............................................. G01V 5/10
[52] U.S. Cl. ..................................... 250/266; 250/269
[58] Field of Search ................. 250/266, 265, 264, 269

[56] References Cited

U.S. PATENT DOCUMENTS

| | | | |
|---|---|---|---|
| 2,680,201 | 6/1954 | Scherbatskoy . | |
| 2,769,918 | 11/1956 | Tittle . | |
| 2,776,378 | 1/1957 | Youmans . | |
| 3,321,625 | 5/1967 | Wahl . | |
| 3,483,376 | 12/1969 | Locke et al. . | |
| 3,532,884 | 10/1970 | Dewan | 250/266 |
| 3,864,569 | 2/1975 | Tittman | 250/269 |
| 3,906,224 | 9/1975 | Scott et al. | 250/266 |
| 4,004,147 | 1/1977 | Allan | 250/264 |
| 4,005,290 | 1/1977 | Allen . | |
| 4,092,536 | 5/1978 | Smith | 250/266 |
| 4,241,253 | 12/1980 | Allen | 250/390 |
| 4,268,749 | 5/1981 | Mills | 250/269 |
| 4,297,575 | 10/1981 | Smith, Jr. et al. | 250/269 |

OTHER PUBLICATIONS

Allan, "Dual-Spaced Neutron Logging for Porosity", Geophysics, 32, (1), Feb. 1967, pp. 60-68.

Primary Examiner—Alfred E. Smith
Assistant Examiner—Carolyn E. Fields
Attorney, Agent, or Firm—Hubbard, Thurman, Turner & Tucker

[57] ABSTRACT

A method of determining the porosity of earth formations surrounding a wellbore despite shielding of that formation by well casing, cement or mud cake. The method includes producing fast neutrons in a wellbore and detecting a first epithermal neutron population resulting from passage of neutrons from the source through a designated first region and a second epithermal neutron population resulting from passage of neutrons through a designated second region. The relationship of the logarithms of a first and a second epithermal neutron population resulting from passage of neutrons through a plurality of known porosity homogenous mediums is determined and plotted as a first curve with each point representing a unique value of porosity. A second curve of the logarithms of the first and second epithermal neutron populations in the actual wellbore is plotted. Individual points on the second curve are then corrected to the first curve utilizing known attenuating factors to determine the porosity of the earth formation.

6 Claims, 2 Drawing Figures

EARTH FORMATION POROSITY DETERMINATION WITH DUAL EPITHERMAL NEUTRON DETECTOR SYSTEM

This invention generally relates to well logging methods and apparatus and more particularly relates to methods and apparatus for determining the porosity of an earth formation adjacent to a well bore, said method and apparatus being useful from within a cased well, and said method and apparatus including the use of at least one fast neutron source and two or more spaced-apart epithermal neutron detectors.

BACKGROUND OF THE INVENTION

Methods and apparatus pertinent to the instant invention are disclosed in the following U.S. patents:

U.S. Pat. No. 2,769,918 issued to Tittle on Nov. 6, 1956, which discloses apparatus having a neutron source and a single epithermal neutron detector to be used for the purpose of determining the hydrogen content of an adjacent earth formation;

U.S. Pat. No. 2,776,378 issued to Youmans on Jan. 1, 1957, which discloses a source of fast neutrons and two detectors for simultaneously measuring the thermal neutron flux and the gamma ray flux at two different points to compensate for the effect of hydrogen in an adjacent formation and to compensate for the effects of variations in the average capture cross section of the material in the formation;

U.S. Pat. No. 3,321,625 issued to Wahl on May 23, 1967, which discloses a gamma ray source and two gamma ray detectors to determine the density of the surrounding earth formation while compensating for the drilling mud filter cake masking the earth formation adjacent to a well bore;

U.S. Pat. No. 3,483,376 issued to Locke et al., on Dec. 9, 1969, which discloses a fast neutron source and two adjacent thermal neutron detectors to determine the porosity of the surrounding earth formation which may be shielded behind well casing and cement in a well bore;

U.S. Pat. No. 4,004,147 issued to Allen on Jan. 18, 1977, which discloses a source of fast neutrons and a pair of thermal neutron detectors spaced apart from said source to determine the porosity of an earth formation surrounding an uncased well bore.

Another reference which also furnishes some valuable background is a paper by L. S. Allen et al., entitled "Dual-Spaced Neutron Logging for Porosity" which was published in the February, 1967, issue of GEOPHYSICS.

As is evident upon perusal of the above-stated references, much work has been performed toward determining the porosity and density of earth formation employing nuclear logging techniques.

With regard to the instant invention, the most pertinent of the above-referenced materials is considered to be U.S. Pat. No. 3,321,625 issued to Wahl. Wahl discloses the detection of gamma rays at two positions spaced apart from a gamma ray source to determine the density of earth formation surrounding an uncased well bore wherein the "mudcake" effect is compensated for. The Wahl method (commonly identified as the gamma-gamma density method) and tool is not considered by applicant to be suitable for determining the porosity of earth formations adjacent to a well which are obscured by the shielding effects of the well casing and cement surrounding a typical cased borehole.

To the best knowledge of the Applicant, the instant invention is the first and only fast neutron technique suitable for providing quantitative values of porosity of earth formations located behind the casing and cement of cased wells.

This invention can fulfill several needs in a manner not previously available. The invention may be used in production logging of cased wells to re-evaluate existing reservoirs. The invention may also be used to monitor water injection or gas injection intervals in cased well bores. The invention may also be used for logging cased well bores in routine wells where only restricted well logging is authorized for the sake of economy. Further, the invention may be used for monitoring subsistence wells in depleted zones, storage zones, and the like. Still further, the invention may be used in the reworking of old wells which have never been logged or which previously have had uncased hole logs only (such as resistitivity logs), particularly in large old fields. The instant invention may be used in lieu of or as a supplement to substantially all applications where the above-mentioned gamma-gamma density log is currently being employed.

A primary object of the instant invention, which fulfills a long recognized need, is to measure the porosity of earth formation shielded and obscured behind well casing and cement conveniently and effectively, and to provide quantitative values of such porosity.

Another object of the instant invention is to measure the porosity of earth formations adjoining uncased boreholes with the same well logging tool.

SUMMARY OF THE INVENTION

The foregoing and other objects are attained by means of the method and apparatus of the instant invention, which includes the production of fast neutrons in a well bore, the detection of the intensity of a first epithermal neutron flux which has passed from a fast neutron source into a first designated earth formation region located around the well bore, and the detection of the intensity of a second epithermal neutron flux which has passed from the said fast neutron source into a second designated region of greater volume than said first region, wherein said second region includes said first region. A flux density relationship is established by comparing the intensity of the first neutron flux with the intensity of the second neutron flux. An accurate indication of the porosity of the pertinent earth formation is then determinable as a function of said intensity relationship.

DESCRIPTION OF THE PREFERRED EMBODIMENT

It will become apparent that this invention may be utilized in the logging of earth formations for porosity determination, wherein the following definitions and equations are applicable:

Q = Number of fast neutrons emitted per second by the source.

$\phi_s$ = Epithermal neutron flux at the short-spaced detector.

$\phi_L$ = Epithermal neutron flux at the long-spaced detector.

$D_l$ = Epithermal diffusion coefficient (Wherein ln $D_l$ ranges from approximately 4.51 to 4.34 with usable average of 4.42).

$L_l$ = Epithermal diffusion length (cm.).
$r_s$ = Short spacing (cm.).
$r_L$ = Long spacing (cm.).
K = Bias-level constant.
$\epsilon$ = Base of natural logarithms = 2.71828.

Wherein:

$$\phi_s = \frac{Q}{4\pi D_1} \cdot \frac{\epsilon^{-\frac{r_s}{L_1}}}{r_s} \quad (1)$$

and, $$\phi_L = \frac{Q}{4\pi D_1} \cdot \frac{\epsilon^{-\frac{r_L}{L_1}}}{r_L} \quad$$

Defining:

$$X = \ln \phi_s = -\frac{r_s}{L_1} + \ln \frac{Q}{4\pi} - \ln D_1 - \ln r_s \quad (2)$$

and, $$Y = \ln \phi_L = -\frac{r_L}{L_1} + \ln \frac{Q}{4\pi} - \ln D_1 - \ln r_L$$

Therefore, by eliminating $L_l$ in the equations for X and Y, we get:

$$Y = X \cdot \frac{r_L}{r_s} + K \quad (3)$$

Figure 1:
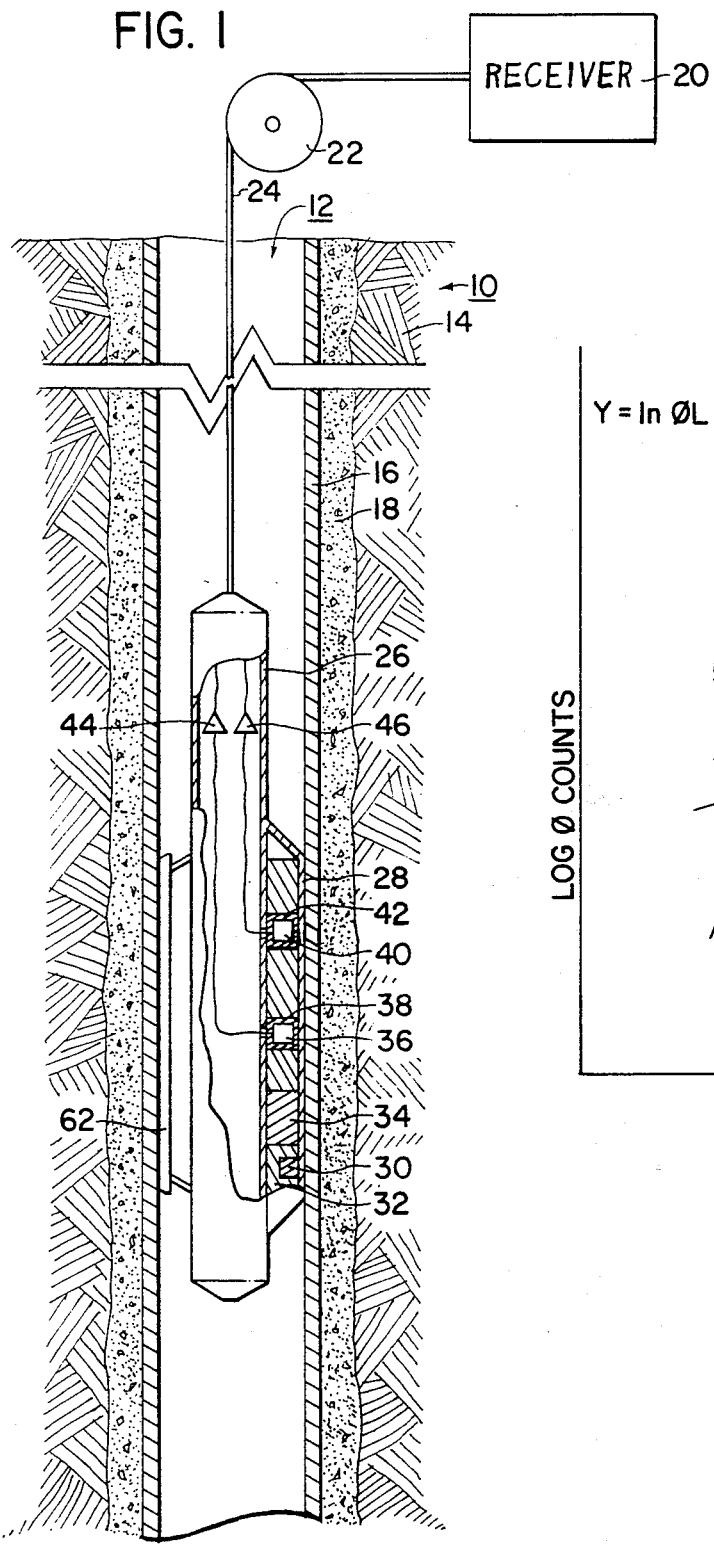
FIG. 1 is a schematic illustration of the preferred apparatus of the instant invention.

Referring now to the drawing, and more particularly to FIG. 1, there is shown schematically a well logging unit 10 situated to perform well logging operations in a well bore 12 which has been drilled through an earth formation 14.

Implaced within the well bore 12 is a steel well casing 16 which has been cemented into place within the formation 14 with a body of cement 18.

The logging unit 10 as shown includes a receiving unit 20 disposed at the earth's surface which further includes a sheave 22 and a well logging cable 24 which extends from the unit 20 around the sheave and down into the well bore 12 to support a logging sonde or tool 26. As shown, the sonde 26 includes a detector contact pad 28 in which are mounted the several elements required for the present invention. The exterior face of pad 28 (not shown) is semi-circular in cross section in order to substantially conform to the interior face of the casing 16. The pad 28 is maintained in contact with the interior face of casing 16 during the logging operation by an articulated stand-off pad assembly 62, or an equivalent bow spring.

Mounted at the lower end of the pad 28 is a source 30 of fast neutrons mounted within a directional shield member 32. Mounted above the shield 32 within the case 28 may be a second shield member 34. A number of materials may be utilized as the neutron source 30 with examples being radium/beryllium, polonium/beryllium, plutonium/beryllium, californium, and the like. The shield 32 for the source 30 should be able to function as a directional "window" for the fast neutrons emanating from the source.

The neutron shield members 32 and 34 have the primary function of shielding the later discussed detectors mounted above the source from any neutrons emanating directly from the source and, as examples, the neutron shield 34 may be provided of graphite, paraffin, beryllium oxide, boron carbide, or similar material having a high neutron moderating and absorption cross section. Compounds of cadmium, boron, lithium, or mixtures of boric acid and paraffin, and the like, may be used. Fabricated shields including one to several of the above materials may be employed.

Mounted above the neutron shield 34 in the contact pad 28 is a first epithermal neutron detector 36. The neutron detector 36 is shielded from thermal neutrons by means of a shield 38 which encloses the detector 36.

Also mounted within case 28 above the detector 36, and still further away from the source 30, is a second neutron detector 40. The detector 40 is also shielded from thermal neutrons by means of a shield 42 which encloses the detector 40.

The neutron shields 38 and 42 are seen to prevent thermal neutrons from passing into the detectors 36 and 40 such that only epithermal neutrons may pass through these shields to actuate the detectors.

To minimize borehole effect, all the detectors may be provided with backshielding (not specifically shown) to moderate and absorb neutrons emanating from directions other than toward the face of contact pad 28.

The neutron detectors 36 and 40 may be provided of the $He_3$ type or of the scintillation type presently in commercial use. The neutron shields 38 and 42 may be provided of cadmium, indium, europium, boron, lithium, or the like, of appropriate thickness to absorb thermal neutrons and yet permit passage of epithermal neutrons above a prescribed energy level, 0.1 electron volts, for example.

As seen in FIG. 1, those epithermal neutrons emanating from the source 30 will pass through the casing 16, the cement 18, a portion of the formation 14, and back through the cement and steel casing to reach either of the detectors 36 or 40.

The spacings of the detectors from the source 30 are such that substantially all the epithermal neutrons reaching either detector will have passed in the above-described sequence with any tending to pass closer to sonde 26 being shielded from the detectors by shield member 34.

Either of the detectors 36 or 40 may be mounted below the source 30 (not shown) so long as appropriate spacing and shielding is maintained.

The outputs of the detectors 36 and 40 respectively are passed into amplifiers 44 and 46 where the detector output signals are amplified and passed on through appropriate circuitry (not shown) and the logging cable 24 to the earth's surface.

The receiver 20 includes suitable receiving circuitry (not shown), data processing apparatus, and recording equipment as is now conventional in the art, to process and record the signals coming from the detectors 36 and 40 through the amplifiers 44 and 46.

A data processing unit or computer now in commercial use and suitable for use with this invention is the Raytheon Model 500 Computer, as provided by Raytheon Data Systems, Raytheon Company, 1415

Boston-Providence Turnpike, Norwood, Mass. 20262. This Raytheon unit may be interconnected and programmed to perform the functions herein described. Similar data processig units are available from Hewlett-Packard Company, Palo Alto, Calif. 94304.

Figure 2:
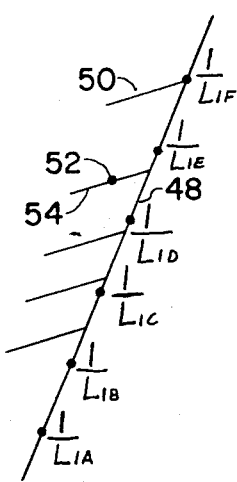
FIG. 2 is a graph illustrating a preferred method of displaying data received by the well logging apparatus of FIG. 1.

FIG. 2 is a graph of curves produced with the apparatus as previously described. As shown, the logarithms of the responses of the detectors 36 or 40 bear a linear relationship to each other and are inversely related as a function of the porosity of the surrounding earth formations. This relationship is shown by curve 48 in FIG. 2. Curve 48 (the "spine") is a straight line corresponding to the equation set forth above as applying to a homogeneous medium. Each point indicated along line 48 corresponds to specific values of $(1/L_1)$ as shown, which in turn each correspond to a separate unique value of porosity.

With the steel casing 16 and cement 18 shielding the formation 40 as shown in FIG. 1, the responses of the detectors 36 and 40 will be affected by this shielding material. Such shielding will cause the measurement for a given formation to be displaced from the curve 48, and, in the case of the cement and casing, the shielding will be considered as causing greater attenuation than the surrounding formation, thus causing such displacement to be displaced downward and to the left as indicated by the departure of curve 50 from curve 48.

It is considered that the epithermal neutrons traveling from the source 30 to the detectors 36 and 40 travel at random through elastic scattering. When the composite flux attenuating factor of the steel casing and the cement is known, as generally is the case, then corrections may be made such that the curves 50, 54, etc. (the "ribs"), will be displaced to the part of their section of the curve 48 and thereby give a true indication of the porosity of the surrounding formation 14.

Each point, such as point 52, reflects a designated casing thickness, a designated cement thickness and a particular formation porosity.

The above-described plotting technique can be easily handled by appropriate programming of the computer included within receiver 20 with the computer output being recorded as a continuous curve along a well log chart as a direct indication of formation porosity.

The instant invention, as disclosed and claimed herein, will fulfill a long existing need for means to measure the porosity of formations which are obscured by well casing and cement. The same means and method may be employed to measure the formation porosity in the vicinity of uncased well bores as is currently performed by conventional tools which use a gamma ray source and dual gamma ray detectors. The porous formations around uncased well bores are often shielded or obscured by a thick accumulation of drilling mud cake.

The embodiments illustrated and disclosed herein may have various modifications and embellishments, all within the capability of those skilled in the art. The definition of the invention is intended to be limited only by the scope of the following claims.

What is claimed is:

1. A method of determining the porosity of earth formations surrounding a wellbore shielded by well casing and cement, comprising:
    producing fast neutrons in a wellbore from a neutron source;
    detecting a first epithermal neutron population resulting from passage of neutrons from said source through a designated first region disposed adjacent to said wellbore, said first region including at least a thickness of said well casing and said cement;
    detecting a second epithermal neutron population resulting from passage of neutrons from said source through a designated second region disposed adjacent to said wellbore, said second region also including said well casing and said cement;
    determining the relationship between the logarithm of a first detected epithermal neutron population resulting from passage of neutrons from said source through a designated first region of a plurality of known porosity homogenous mediums and the logarithm of a second detected epithermal neutron population resulting from passage of neutrons from said source through a designated second region of a plurality of known porosity homogenous mediums;
    plotting said relationship as a first curve, each point of which represents a unique value of porosity;
    plotting a second curve comprising the logarithm of said first detected epithermal neutron population resulting from passage of neutrons from said source through said designated first region disposed adjacent to said wellbore versus the logarithm of said second detected epithermal neutron population resulting from passage of neutrons from said source through said designated second region disposed adjacent to said wellbore; and
    correcting individual points on said second curve to corresponding points on said first curve utilizing known attenuating factors for said well casing and said cement wherein the porosity of said earth formation at that point may be determined.

2. The method according to claim 1 wherein detecting said first and second epithermal neutron populations excludes the detecting of thermal neutron populations from said first and second regions disposed adjacent to said wellbore.

3. The method according to claim 1 wherein said neutron source is directed to emit fast neutrons toward a designated portion of the side wall of said wellbore.

4. A method of determining the porosity of earth formations surrounding a wellbore shielded by drilling mud cake, comprising:
    producing fast neutrons in a wellbore from a neutron source;
    detecting a first epithermal neutron population resulting from passage of neutrons from said source through a designated first region disposed adjacent to said wellbore, said first region including at least a thickness of said drilling mud cake;
    detecting a second epithermal neutron population resulting from passage of neutrons from said source through a designated second region disposed adjacent to said wellbore, said second region also including said drilling mud cake;
    determining the relationship between the logarithm of a first detected epithermal neutron population resulting from passage of neutrons from said source through a designated first region of a plurality of known porosity homogenous mediums and the logarithm of a second detected epithermal neutron population resulting from passage of neutrons from said source through a designated second region of a plurality of known porosity homogenous mediums;

plotting said relationship as a first curve, each point of which represents a unique value of porosity;

plotting a second curve comprising the logarithm of said first detected epithermal neutron population resulting from passage of neutrons from said source through said designated first region disposed adjacent to said wellbore versus the logarithm of said second detected epithermal neutron population resulting from passage of neutrons from said source through said designated second region disposed adjacent to said wellbore; and correcting individual points on said second curve to corresponding points on said first curve utilizing known attenuating factors for said drilling mud cake wherein the porosity of said earth formation at that point may be determined.

5. The method according to claim 4 wherein detecting said first and second epithermal neutron populations excludes the detecting of thermal neutron populations from said first and second regions disposed adjacent to said wellbore.

6. The method according to claim 4 wherein said neutron source is directed to emit fast neutrons toward a designated portion of the side wall of said wellbore.

* * * * *

UNITED STATES PATENT AND TRADEMARK OFFICE
CERTIFICATE OF CORRECTION

PATENT NO. : 4,506,156

DATED : March 19, 1985

INVENTOR(S) : Marcel L. Mougne

It is certified that error appears in the above-identified patent and that said Letters Patent is hereby corrected as shown below:

Column 2, line 47, (page 3, line 20), "density" should be --intensity--.

Signed and Sealed this

Ninth Day of July 1985

[SEAL]

Attest:

DONALD J. QUIGG

Attesting Officer

Acting Commissioner of Patents and Trademarks